United States Patent
Gessner

(12) 
(10) Patent No.: US 6,338,488 B1
(45) Date of Patent: Jan. 15, 2002

(54) SEALING SYSTEM ENABLING AN ASSEMBLY

(75) Inventor: Norbert Gessner, Friedrichsthal (DE)

(73) Assignee: Saarbergwerke Aktiengesellschaft, Saarbrücken (DE)

( * ) Notice: Subject to any disclaimer, the term of this patent is extended or adjusted under 35 U.S.C. 154(b) by 0 days.

(21) Appl. No.: 09/284,071

(22) PCT Filed: Jul. 10, 1998

(86) PCT No.: PCT/DE98/01931

§ 371 Date: Apr. 26, 1999

§ 102(e) Date: Apr. 26, 1999

(87) PCT Pub. No.: WO99/08025

PCT Pub. Date: Feb. 18, 1999

(30) Foreign Application Priority Data

Aug. 7, 1997 (DE) .......................................... 197 34 213

(51) Int. Cl.$^7$ ................................................. F16J 15/54
(52) U.S. Cl. ........................................ 277/300; 277/457
(58) Field of Search ................................ 277/300, 457, 277/451, 452, 609

(56) References Cited

U.S. PATENT DOCUMENTS

| | | | | |
|---|---|---|---|---|
| 2,862,736 A | * | 12/1958 | Russell |
| 2,892,645 A | * | 6/1959 | Tydeman |
| 3,834,719 A | * | 9/1974 | Shin et al. |
| 5,016,524 A | * | 5/1991 | Kawai et al. |

* cited by examiner

Primary Examiner—Lynne H. Browne
Assistant Examiner—James M Hewitt
(74) Attorney, Agent, or Firm—James Creighton Wray; Meera P. Narasimhan

(57) ABSTRACT

A method and device for a fit to size assembly of components or machine parts is provided in which fixed or relatively moving machine parts are sealed against inlet and outlet of a fluid material. A sealing member used for this sealing cannot be put in a position during the assembly, which is required for a fit-to-size assembly. The assembly includes an elastic sealing member inserted into an annular groove that is made in one of the machine parts being sealed relative to another part. The groove communicates with a sealing seat and an overpressure is built up in a space in the groove which is sealed by the sealing member through a passage open to the outside. The overpressure causes the sealing member to move to the sealing seat.

9 Claims, 1 Drawing Sheet

SEALING SYSTEM ENABLING AN ASSEMBLY

BACKGROUND OF THE INVENTION

The invention relates to a method and device for assuring a fit to size assembly of components and machine parts in a structural unit or a machine, wherein fixed or relatively movable machine parts are sealed against inlet and outlet of fluid substances.

For a fit to size assembly of components and machine parts into a structural unit or a machine with sealing of clearances between fixed or relatively movable parts by means of a sealing member or a sealing system against inlet and outlet of fluid substances, the sealing member can have dimensions during the assembly which overpass the fitting dimensions for the assembly, thus hampering the fit to size assembly or making it impossible to achieve the functionally correct sealing position that cannot be adjusted later.

The functionally correct assembly of components and machine parts, e.g., in a machine having a rotary drive, e.g., in drives of transportation or mining machines requires that predetermined assembly steps be performed, with preliminarily mounted assemblies such as structural units, with the dimensionally accurate fit that do not allow for any dimensional deviations, especially an oversize, projection or overhang.

When sealing of these parts is absolutely required in assembling such machines or structural units, an elastic sealing member that is provided for sealing can be frequently displaced or even damaged, especially when an attempt is made to fit later.

SUMMARY OF THE INVENTION

It is an object of the invention to provide a method for a fit to size assembly of machine parts or structural components, wherein fixed or relatively movable parts, which are sealed against inlet and outlet of fluid materials, can be fitted without damage to a sealing system owing to their design.

According to the invention, this object is accomplished by the fact that an elastic sealing member is inserted, during the assembly of machine parts in a sealing relation, in an annular groove that is made in a machine part and communicated with a sealing seat and by the fact that, after the assembly of the machine parts, an overpressure is built up through a passage that is open to the outside in a space that is sealed by the sealing member inserted into the groove, whereby the sealing member is caused to move to the sealing position.

To carry out the method according to the invention, it is preferred that an elastic seal, generally an elastic rubber sealing ring used as the sealing member is stretched to a length that is greater than the length in the sealing position and inserted into an annular groove made in a machine part. The sealing member is thus installed in a position, which is not the sealing position, with an accurate fit with resect to the adjacent parts to form a correct assembly. The sealing member is moved from the fitting position to the functionally correct sealing position or to the sealing seat during the assembly through indirect or direct pressure application with a pressurized fluid in the direction of movement. For building up pressure, a fluid is used, e.g., a hydraulic fluid or a gas such as compressed air, or this operation can be carried out by using lubrication grease.

It is also preferred in carrying out this method that an auxiliary seal be installed in the groove that receives the sealing member. An overpressure in the space of the groove, which is sealed off by means of the auxiliary seal, acts in such a manner that the sealing member is caused to move to the sealing position under the action of the auxiliary seal moving through the groove under the effect of the overpressure.

It is also preferred that, in order to position the sealing member that has been moved into the sealing position, at least one positioning member, which is made of a non-elastic material, be provided between the sealing member and the auxiliary seal, which is used to assure a preset and stable distance between the sealing member and the auxiliary seal. In this case, the pressure space is sealed by the auxiliary seal, and there is no leakage of the pressurized fluid around it.

The method according to the invention can be used both for the static sealing where so called o-rings are normally used and for sealing rotating components where so called Turcan-Gly-Rings are generally used.

DETAILED DESCRIPTION

Figure 1:
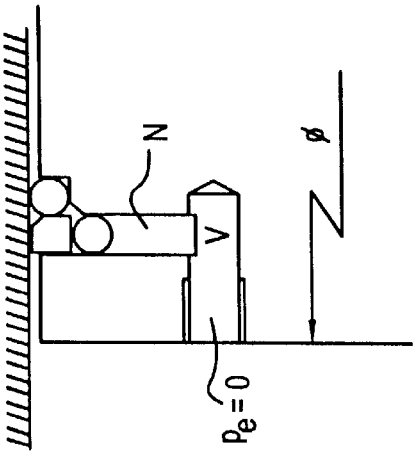
FIG. 1 shows a device that is used as a sealing system.
Figure 2:
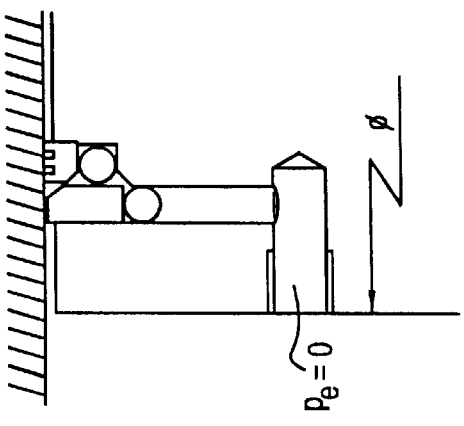
FIG. 2 shows an embodiment for sealing rotating components or machine parts.

FIGS. 1 and 2 show a device that is used as a sealing system, which is illustrated as applied to a simple design of a static sealing between two machine parts, wherein the components are built to use the method according to the invention, with an annular groove made in a machine part that has the sealing seat.

The sealing system has the following components:

an auxiliary seal 1, a guide ring 2 which is used as a positioning member, and a sealing member 3.

A machine part having a sealing seat DS is made with an annular groove N so that the sealing seat DS and the groove N communicate with each other. In this case, the sealing member 3 can be moved from the groove N to the sealing seat DS by building up pressure through an open passage. The groove N has at least one passage V open to the outside, which can be shut off.

In the case of cylindrical components, with a generally circular groove that has its inner diameter $d_2$ that is larger than the diameter $d_1$ of the sealing seat DS, the auxiliary seal 1 is first inserted into the groove, and the guide ring 2 used as a positioning member is then inserted.

The elastic sealing member 3 in its non-stretched form is an elastic rubber sealing ring that has its inner diameter that is smaller than the inner diameter of the groove, so it should be stretched before insertion into the groove.

This elastic pre-tensioning is necessary to assure application of pressure (the gauge pressure $p_e>0$) after the assembly of the components through the passage V to activate the sealing system and to cause the sealing member 3 to its preset sealing position at the sealing seat DS.

The auxiliary sealing 1 is subjected, after the assembly of the components, to the action of compressed air, grease or other pressurized fluid supplied through an inlet with the inner thread. This pressure causes the other components of the sealing system such as the positioning member made as the guide ring 2 and the sealing member 3 to move along the edge of the groove in the direction toward the sealing seat. The sealing member 3 slides under the effect of the elastic pre-tensioning over the chamfered shoulder of the groove to its working sealing position at the sealing seat DS on the diameter $d_1$.

The guide ring 2 used as the positioning member moves up to the sealing member 3 and holds it in place slightly pressed against the sealing seat DS and keeps it against eventually moving backwards in the event the auxiliary seal 1 gets out of the groove. The open connection between the groove and the space of the sealing seat is thus sealed off.

Figure 3:
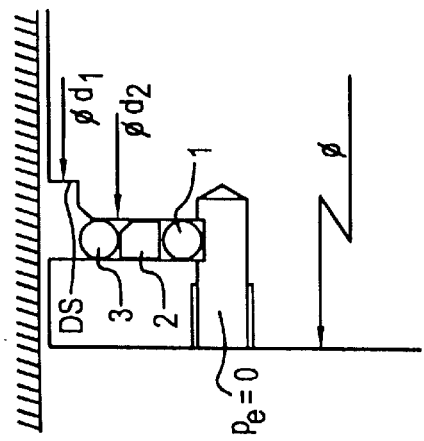
Figure 4:
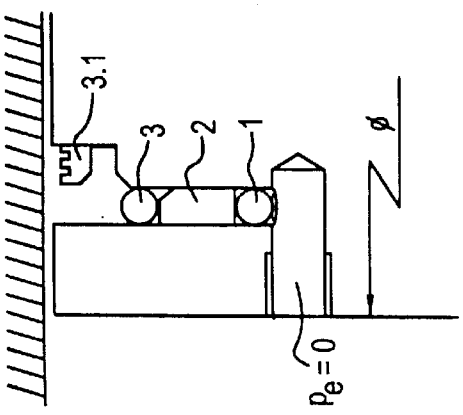

FIGS. 3 and 4 show an embodiment for sealing rotating components or machine parts, wherein a similar sealing member 3 is protected against the wear during rotation by the fact that an auxiliary sliding ring 3.1 is provided between the surface over which the sealing member is to drag and the sealing member 3 proper. This auxiliary sliding ring is brought to, and held in its working position by the guide ring 2 used as the positioning member and by the sealing member 3. In this manner, the sealing capacity of the sealing member 3 is not impaired.

LIST OF THE REFERENCE NUMERALS

1 Auxiliary seal
2 Positioning member, e.g., guide ring
3 Sealing member 3 of elastic rubber
3.1 Protective sealing member
DS Sealing seat
N Groove
V Passage that is open to the outside, which can be shut off
$d_1$ DS fit diameter
$d_2$ N fit diameter

What is claimed is:

1. An assembly method for fit-to-size assembly of components and machine parts into a structural unit or a machine having fixed or relatively moving machine parts sealed against inlet and outlet of fluid materials, the method comprising forming an annular groove in the machine parts, inserting an elastic sealing member during assembly into the annular groove, communicating the annular groove with a sealing seat and after assembling the machine parts with the sealing member, building an overpressure in a space in the groove, sealing the groove with the inserted sealing member with the overpressure built through a passage open to an outside of the machine parts, and thereby moving the sealing member to the sealing seat.

2. The method of claim 1, wherein a fluid is used in the building an overpressure in the space in the groove.

3. The method of claim 1, wherein a gas is used in the building an overpressure in the space in the groove.

4. An assembly method for fit-to-size assembly of components and machine parts into a structural unit or a machine having fixed or relatively moving machine parts sealed against inlet and outlet of fluid materials, the method comprising forming an annular groove in the machine parts, inserting an elastic sealing member during assembly into the annular groove, communicating the annular groove with a sealing seat and after assembling the machine parts with the sealing member, building an overpressure in a space in the groove, sealing the groove with the inserted sealing member with the overpressure built through a passage open to an outside of the machine parts, and thereby moving the sealing member to the sealing seat, further comprising inserting an auxiliary seal into the groove having the sealing member, sealing the groove with the auxiliary seal and causing the sealing member to move to the sealing seat due to the auxiliary seal moving through the groove under the built overpressure.

5. The method of claim 4, further comprising providing at least one positioning member of non-elastic material between the sealing member and the auxiliary seal for positioning the sealing member.

6. The method of claim 5, further comprising providing another member of non-elastic material between the sealing member and an adjacent surface of one of the machine parts for protecting the sealing member.

7. An assembly device for fit-to-size assembly of components and machine parts into a structural unit or a machine having fixed or relatively moving machine parts sealed against inlet and outlet of fluid materials, comprising an annular groove in the machine parts, a sealing seat proximal the annular groove, the sealing seat and the groove communicating with a passage, a sealing member movably positioned in the groove for moving through the passage to the sealing seat and wherein the passage is at least one closable passage in the groove opening to an outside of the machine parts.

8. An assembly device for fit-to-size assembly of components and machine parts into a structural unit or a machine having fixed or relatively moving machine parts sealed against inlet and outlet of fluid materials, comprising an annular groove in the machine parts, a sealing seat proximal the annular groove, the sealing seat and the groove communicating with a passage, a sealing member movably positioned in the groove for moving through the passage to the sealing seat and wherein the passage is at least one closable passage in the groove opening to an outside of the machine parts, further comprising a movable auxiliary elastic seal provided in the groove for causing the sealing member to move toward an end of the groove.

9. The device of claim 8, further comprising at least one positioning member provided between the sealing member and the auxiliary seal.

* * * * *